US007089009B1

(12) United States Patent
Fauconnier

(10) Patent No.: US 7,089,009 B1
(45) Date of Patent: Aug. 8, 2006

(54) METHOD AND APPARATUS FOR SETTING UP A COMMUNICATION WITH A TARGET BASE STATION IN A CELLULAR OR CORDLESS MOBILE TELECOMMUNICATIONS SYSTEM

(75) Inventor: Denis Fauconnier, Saint-Remy lès Chevreuse (FR)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/807,785

(22) PCT Filed: Oct. 19, 1999

(86) PCT No.: PCT/EP99/07934

§ 371 (c)(1),
(2), (4) Date: Jun. 11, 2001

(87) PCT Pub. No.: WO00/24213

PCT Pub. Date: Apr. 27, 2000

(30) Foreign Application Priority Data

Oct. 19, 1998 (EP) .................................. 98402598

(51) Int. Cl.
*H04Q 7/20* (2006.01)
(52) U.S. Cl. ...................... 455/445; 445/436; 445/437; 445/438; 445/439; 370/352; 370/356; 370/357
(58) Field of Classification Search ............... 455/445, 455/436, 437, 438, 439; 370/352, 356, 357, 370/400, 406
See application file for complete search history.

(56) References Cited

U.S. PATENT DOCUMENTS

| 5,487,065 A | * | 1/1996 | Acampora et al. | 370/331 |
| 5,528,583 A | * | 6/1996 | Acampora et al. | 370/256 |
| 5,590,126 A | * | 12/1996 | Mishra et al. | 370/329 |
| 5,603,096 A | * | 2/1997 | Gilhousen et al. | 455/69 |
| 5,875,185 A | * | 2/1999 | Wang et al. | 370/331 |

* cited by examiner

*Primary Examiner*—Matthew Anderson
*Assistant Examiner*—Minh Dao
(74) *Attorney, Agent, or Firm*—Barnes & ThornburgLLP

(57) ABSTRACT

Methods, systems and network elements are described to improve the speed of handover in a mobile radio telecommunications system. In one embodiment a mobile terminal (114) transmits a list of addresses of network nodes (102, 103, 105, 122, 125) to a target base station (106) in preparation for setting up a new radio link to the target base station (106). The list of addresses can be used by the target base station (106) to select a node (122, 125) which is common to both the old and the new communication path and to address this node directly without requiring a cross-over switch network query. The new path (122, 110, 106) can then be set up quickly ready for the handover to target base station (106). In a further embodiment the network distributes pre-authenticated signatures for a mobile terminal (114) to the nodes (102, 103, 105, 122, 125) of the network currently supporting a communication. This allows local verification of a mobile terminal (114) when it attempts to set up a new radio link with a target base station (106). In yet a further embodiment the target base station (106) starts fast power control with the mobile terminal (114) before the new communications path (125, 110, 106) has been set up through the network.

20 Claims, 6 Drawing Sheets

| LOOK UP TABLE | | | |
|---|---|---|---|
| VCI IN | PORT IN | VCI OUT | PORT OUT |
| VC2 | 63 | VC0 | 65 |
| VC1 | 66 | VC3 | 64 |

| LOOK UP TABLE | | | | | |
|---|---|---|---|---|---|
| ENABLED | VCI IN | PORT IN | VCI OUT | PORT OUT | SIGNATURE |
| 1 | VC1 | 73 | VC2 | 61 | MT33 |
| 0 | VC1 | 73 | VC7 | 60 | MT33 |
| 1 | VC3 | 62 | VC4 | 74 | MT33 |
| 0 | VC5 | 59 | VC4 | 74 | MT33 |

METHOD AND APPARATUS FOR SETTING UP A COMMUNICATION WITH A TARGET BASE STATION IN A CELLULAR OR CORDLESS MOBILE TELECOMMUNICATIONS SYSTEM

The present invention relates to a method of forward handover (sometimes known as "hand off") or for certain types of call restablishment in a cellular or cordless mobile telecommunications system. Embodiments of the present invention may find application in many forms of mobile telecommunications system independent of the access method, e.g. FDMA, TDMA, FDMA/TDMA, CDMA, FDMA/TDMA/CDMA, TDD, CDMA/TDD or similar methods. The present invention may also relate to a mobile telecommunications network and a method of operating the same.

TECHNICAL BACKGROUND

Cellular mobile telephone systems rely on the reuse of radio frequencies in different cells or radio coverage areas. When a mobile terminal moves from communication with a base station in one cell (original base station) to another it is necessary to "handover" the mobile terminal to the base station (target base station) of the new cell. Handovers may be passive or active, i.e. a handover may be necessary when there is no active communication and the mobile terminal is "camped" on the current cell and must be transferred to the new cell (passive handover) or when there is an active communication which must be transferred from the current to the target base station (active handover). In order to avoid loss of data during an active handover it is preferred if the handover is quick. In order to improve the speed of handovers both "seamless" and "soft" handovers have been proposed. A seamless handover is a "hard" handover (new connection to the target base station is made at the time of loss of the old connection) in which the network connections up to the target base station are reserved and synchronised so that when the actual handover takes place there is the minimum of interruption between breaking the communication with the old base station and connecting through to the new base station. In a soft handover the mobile terminal communicates with both the old base station and the target base station at the same time and the network may decide, based on certain communication qualities or other criteria, when the signals arriving via the target base station are acceptable and the link to the original base station may be broken.

Hard handover methods may suffer from suddenly varying signal strength. The deterioration of the signal quality of communications with the original base station may be masked by shadowing and widely varying fading on the current communication channel so that the reduction in signal quality which triggers the handover may occur suddenly and catastrophically (for example, the "corner effect"). In this situation communication with the original base station is lost suddenly and a handover procedure which relies on a handover request being sent to the original base station may fail. Schemes have been proposed to deal with this situation, e.g. on loss of communication with the original base station the mobile terminal attempts a forward handover, i.e. it tries to make contact with a target base station and the network attempts to set up the new route through the network from the target base station. Setting up the new network path takes some time, particularly as the network has not been prepared in any way for this emergency operation, so that it is almost impossible with this method not to loose some data. Very often the complete communication is lost.

An alternative is to allow communication with more than one base station at the same time so that sudden loss of communication with one base station has no affect on the current communication. A method and a system for providing a communication with the mobile terminal through more than one base station during the handover process are disclosed in U.S. Pat. No. 5,625,876. Using this system, a communication between the mobile terminal and the end user is not interrupted by a handoff from the original base station to a target base station. This type of handover may be considered as a "soft" handover in that communication with the target base station is established before communication with the original base station is terminated. When the mobile terminal is in communication with two base stations, a single signal for the end user may be created from the signals from each base station by a cellular or personal communication system controller.

In systems in which a mobile terminal may communicate with several base stations at the same time, e.g. CDMA systems, mobile terminal assisted handoff may operate based on the signal strength of beacon or pilot signals from several sets of base stations as measured by the mobile terminal. An Active Set is the set of base stations through which active communication is established. The Neighbour Set is a set of base stations surrounding an active base station comprising base stations that have a high probability of having a pilot or beacon signal strength of sufficient level to support communication of adequate quality. The Candidate Set is a set of base stations having a pilot or beacon signal strength of sufficient level to establish communication.

When communications are initially established, a mobile terminal communicates through a first base station and the Active Set contains only the first base station. The mobile terminal monitors the pilot or beacon signal strength of the base stations surrounding at and each of these is allocated to the Active Set, the Candidate Set, or the Neighbour Set. When a pilot or beacon signal of a base station in the Neighbour Set exceeds a predetermined threshold level, the base station is added to the Candidate Set and removed from the Neighbour Set of the mobile terminal. The mobile terminal communicates a message to the original base station identifying the new base station. A cellular or personal communication system controller decides whether to establish communication between the new base station and the mobile terminal. Should the cellular or personal communication system controller decide to do so, the cellular or personal communication system controller sends a message to the new base station with identifying information about the mobile terminal and a command to establish communications therewith. A message is also transmitted to the mobile terminal through the original base station. The message identifies a new Active Set that includes the original and the new base stations. The mobile terminal searches for the new base station transmitted information signal and communication is established with the new base station without termination of communication through the original base station. This process can continue with additional base stations.

When the mobile terminal is communicating through multiple base stations, it continues to monitor the signal strength of the base stations of the Active Set, the Candidate Set, and the Neighbour Set. Should the signal strength corresponding to a base station of the Active Set drop below a predetermined period of time, the mobile terminal generates and transmits a message to report the event. The cellular or personal communication system controller receives this message through at least one of the base stations with which the mobile terminal is communicating. The cellular or personal communication system controller may decide to terminate communications through the base station having a weak pilot or beacon signal strength.

The cellular or personal communication system controller upon deciding to terminate communications through a base station generates a message identifying a new Active Set of base stations. The base station through which communication is established sends a message to the mobile terminal. The cellular or personal communication system controller also communicates information to the relevant base station to terminate communications with the mobile terminal. The mobile terminal communications are thus routed only through base stations identified in the new Active Set. In a cellular or personal communication telephone system, maximising the capacity of the system in terms of the number of simultaneous telephone calls that can be handled is also extremely important. If the mobile terminal is communicating simultaneously with several base stations, for example, when the mobile terminal is close to the boundaries of several different cells, additional radio and network resources are occupied which reduces the total capacity of the system. Hence, it is advantageous to limit the number of simultaneous communications of the same data using up radio capacity. Further, a high bit-rate, high priority mobile terminal which approaches a cell boundary may be operating at high power due to poor communication channels. This high power signal may seriously increase the noise level in the target cell. Generally, fast power control of the mobile terminal from the target base station will only be effective after the soft handover is complete. During this delay the users in the target cell may receive poor communication quality and/or loss of their calls.

As mobile cellular telephone systems have become more sophisticated, the handover requirements have also become more complex. In particular, there is an increase in the types of communications supported by mobile telecommunication systems and the requirements of these communications may be widely different. Important parameters of any communication may be its urgency, i.e. how quickly must the handover take place and how much delay or interruption is acceptable, its bandwidth, its minimum or preferred signal quality, its data rate, its priority, i.e. is the communication a premium service which may take priority over less important messages. Conventionally, certain types of data are considered to require a very quick handover with little loss or delay of the communication, e.g. telephone conversations. The increasing use of Internet telephones indicates, however, that delays in voice communications may be acceptable provided there is a significant cost saving. In addition, there is an increasing use of voicemail. Some telephone users only use their fixed telephones for outgoing calls and switch all ingoing calls to voicemail leaving them undisturbed until they wish to create a communication. With voicemail it is only necessary that the voice information is recorded accurately, exactly when it arrives is not of such a great importance. These changes in voice communications mean that different levels of service may be provided by the mobile communication network operator, e.g. a high price voice communication with high urgency and priority and a low price voice communication in which delays in duplex communications are possible and have to be accepted. On the other hand, certain types of data transmissions suffer greatly if there is an interruption during handover. Also, the bandwidth for different types of voice or data transmissions may vary widely, e.g. video, computer file downloads, voice or fax. Thus, there are several different qualities of service (QoS) which may be required for any particular transmission. During a handover the required QoS of the current transmission may be one of the parameters which influences the handover decision, i.e. can the new path support the required QoS. Checking the QoS for the new path requires knowledge about the properties of the new route from the target base station through the network to the end user to decide whether or not it meets the minimum QoS or the present QoS of the current transmission. This increase in sophistication of the handover decision increases its complexity and the time taken for its successful completion. For example, if one of the QoS requirements of an existing transmission is its priority i.e. it has a higher priority than other transmissions in the old cell or new cell it may be necessary to terminate lower priority communications in the target cell or to arrange for them to be handed over to another cell before the high priority communication can itself be handed over.

Summarising the above, there is a need for a very fast handover which can accommodate QoS requirements such as priority, urgency, bandwidth or cell or packet delay and which is easy to implement.

SUMMARY OF THE PRESENT INVENTION

The present invention includes a method of operating a telecommunications system in which mobile terminals may communicate with base stations over an air interface and a communications network is provided for linking each base station to other points in the network via one or more nodes, a communication to another user terminal being supported by one or more radio links between one or more current base stations and a mobile terminal through a plurality of current nodes of the system, the method comprising the steps of: providing to the mobile terminal information defining explicitly a least some of the current nodes of the communications network supporting the communication; and, in preparation for setting up a further radio link between the mobile terminal and a target base station: the mobile terminal transmitting the information defining explicitly a least some of the current nodes of the communications network supporting the communication to the target base station. The method also includes setting up a new path from one of the nodes explicitly defined in the information to the target base station thus reusing part of the old communication path. The explicit information may include the addresses of the nodes or aliases of the addresses, for instance.

The present invention also includes a telecommunication system in which mobile terminals communicate with base stations over radio links, comprising: a communications network for linking each base station to other points in the network via one or more nodes, a communication between a mobile terminal and another user terminal being connected via one or more radio links to one or more current base stations and through a plurality of current nodes of the network, wherein, in preparation for setting up a further radio link between the mobile terminal and a target base station, the mobile terminal is adapted to transmit to the target base station information defining explicitly at least some of the current nodes of the communications network supporting the communication. The explicit information may include the addresses of the nodes or aliases of the addresses, for instance.

The present invention includes a method of operating a telecommunications system in which mobile terminals may communicate with base stations over an air interface and a communications network is provided for linking each base station to other points in the network via one or more nodes, a communication to another user terminal being supported by one or more radio links between one or more current base stations and a mobile terminal through a plurality of current nodes of the system, the method comprising the steps of: providing the mobile terminal with pre-authenticated reference data for that mobile terminal; copying the pre-authenticated reference data to at least some of the current nodes of the communications network supporting the communication; and, in preparation for setting up a further radio link between the mobile terminal and a target base station: the mobile terminal transmitting at least a part of the pre-authenticated reference data to the target base station.

The present invention also includes a telecommunication system in which mobile terminals communicate with base stations over radio links, comprising:

a communications network for linking each base station to other points in the network via one or more nodes, a communication between a mobile terminal and another user terminal being connected via one or more radio links to one or more current base stations and through a plurality of current nodes of the network, wherein, the system is adapted to provide the mobile terminal with pre-authenticated reference data for that mobile terminal and for copying the pre-authenticated reference data to at least some of the current nodes of the communications network supporting the communication, and, in preparation for setting up a further radio link between the mobile terminal and a target base station, the mobile terminal is adapted to transmit to the target base station at least a part of the pre-authenticated reference data.

The present invention includes a method of operating a telecommunications system in which mobile terminals may communicate with base stations over an air interface and a communications network is provided for linking each base station to other points in the network via one or more nodes, a communication to another user terminal being supported by one or more radio links between one or more current base stations and a mobile terminal through a plurality of current nodes of the system, the method comprising the steps of: a target base station beginning fast power control with the mobile terminal in preparation for setting up a further radio link between the mobile terminal and the target base station before the path through the network supporting the further radio link is complete.

The present invention also includes a telecommunication system in which mobile terminals communicate with base stations over radio links, comprising: a communications network for linking each base station to other points in the network via one or more nodes, a communication between a mobile terminal and another user terminal being connected via one or more radio links to one or more current base stations and through a plurality of current nodes of the network, wherein, in preparation for setting up a further radio link between the mobile terminal and a target base station, the target base station is adapted to begin fast power control with the mobile terminal station before the path through the network supporting the further radio link is complete.

The present invention also includes a mobile terminal for use in a telecommunication system in which mobile terminals communicate with base stations over radio links, the mobile terminal being adapted to transmit to a target base station information defining explicitly at least some of the current nodes of the communications network supporting an existing communication in preparation for setting up a further radio link between the mobile terminal and the target base station.

The present invention also includes a network element for use in a telecommunication system in which mobile terminals communicate with base stations over radio links, the network element being adapted to receive information explicitly defining at least some of the current nodes of the communications network supporting an existing communication, and for setting up a communications path with a further network element from the explicit information in preparation for setting up a further radio link between the mobile terminal and the target base station.

The linking technical concept between the embodiments is that of limiting the possibly disturbing effects of a mobile terminal close to the border of one cell on a neighbouring cell by reducing the handover time and/or by starting the fast power control as soon as possible. Handover time may be reduced by transmitting explicit information defining the nodes supporting the existing communication to the target base station from the mobile terminal and/or using pre-authenticated signatures in the handover request which allow verification of the signature in a part of the network local to the target base station. It is preferred in any of the systems, network elements or methods according to the present invention that the explicit information defining nodes supporting the existing communication includes explicit information defining at least two levels of a hierarchical telecommunications network. The explicit references to the nodes of the current communication allow rapid setting up of a partly new path to the target base station while maintaining optimal use of existing paths of the communication.

The information relating to the existing nodes supporting a call may be used as part of several procedures, e.g. a handover procedure, a call re-establishment, to determine whether a member of the Candidate set of the mobile terminal is added to the Active set, or whether a member of the Neighbour set of the mobile terminal is added to the Candidate set.

The present invention will now be described with reference to the following drawings.

BRIEF DESCRIPTION OF THE DRAWINGS

FIG. 4 are schematic look-up tables use to control a switch rerouter in accordance with an embodiment of the present invention.

DESCRIPTION OF THE ILLUSTRATIVE EMBODIMENTS

The present invention will be described with a reference to certain embodiments and drawings but it is not limited thereto but only by the claims. In particular, the present invention will mainly be described with reference to handover procedures, but the present invention may also find application in call re-establishment after loss of the communication channel between a mobile terminal and its current base station or for determining which target base station should be included within the Active set of the mobile terminal. Further, the present invention will mainly be described with reference to cellular mobile telecommunication systems, but the present invention is not limited thereto and may be applied to any mobile telecommunication system, e.g. a cordless telecommunication system such as DECT, which routes messages through a network to transceiver base stations.

Figure 1:
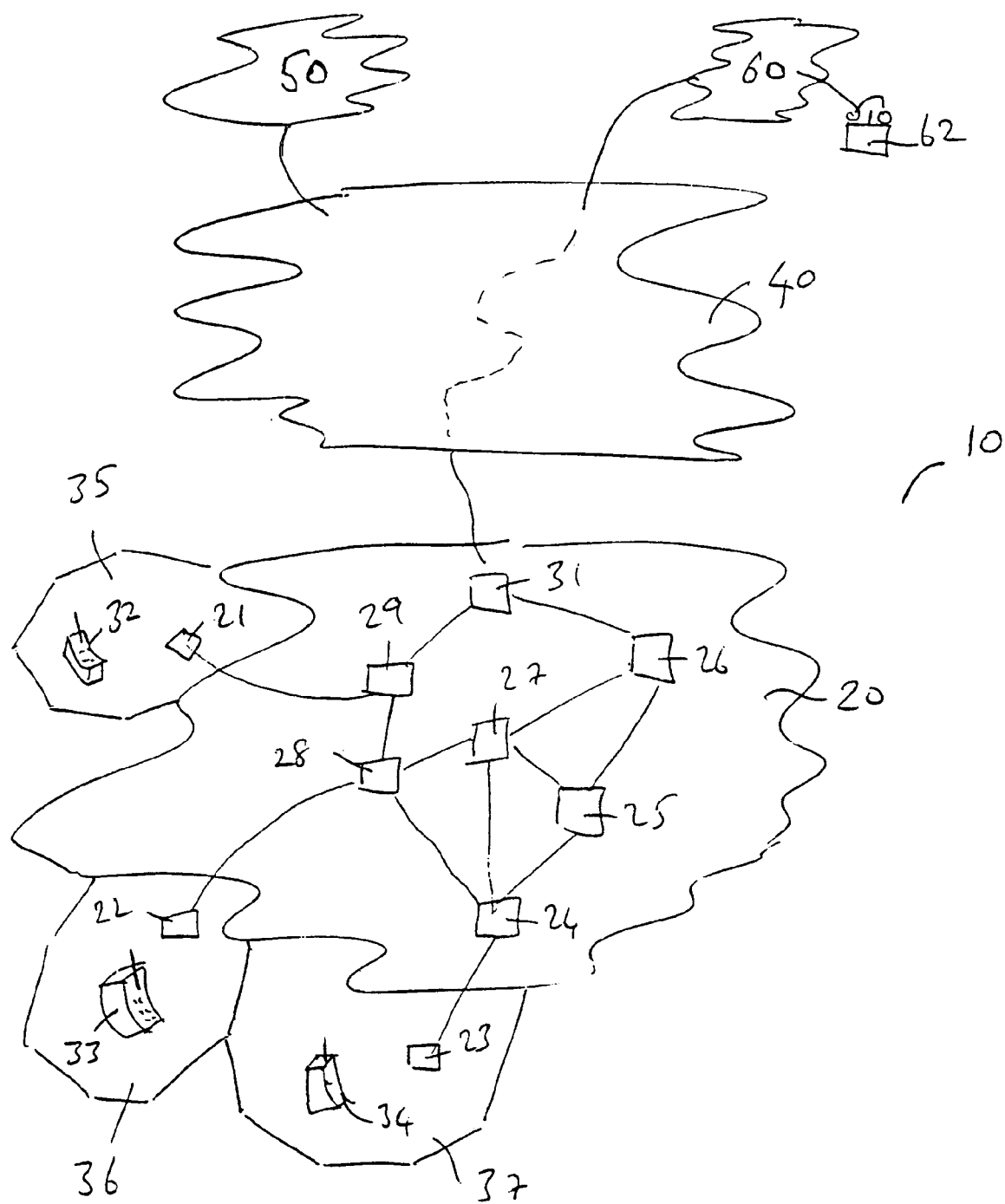
FIG. 1 is a schematic representation of a telecommunications network in accordance with a first embodiment of the present invention.

A first embodiment of the present invention will be described with reference to FIG. 1 which is a schematic representation of a cellular mobile telephone system 10. It may include a first network 20 which provides communication routing to a plurality of base stations 21 to 23, each of which has a radio coverage area or "cell". Network 20 includes the necessary control and execution units to be able to set up a communication between any of the mobile terminals 33 to 34 with any other mobile terminal or with any other user in fixed wireline or mobile telephone networks 50, 60 such as existing public or private mobile telephone networks, PSTN's, or commercial data networks. A portion of the network 10 may include a core network or backbone network 40 for routing calls to and from networks 20, 50 and 60.

Let us assume that an existing call has been set up between a fixed terminal 62 associated with network 60 and a mobile terminal 33. The communication path traverses network 60, network 10 and network 20 whereby the switching node 31 is the gateway switch to network 20. Switches 26, 27 and 28 as well as base station 22 and the radio air interface between base station 22 and mobile terminal 33 support the communication. If the mobile terminal 33 now moves into the radio coverage area 37 of base station 23 it is necessary to handover the communication from base station 22 to base station 23. There are various possibilities for setting up the new path in network 20 from base station 23 to gateway switch 31, whereby some of these routes may take a longer time to set up than others (involve more rerouting procedures at switches) and some may only provide a limited quality of service, e.g. bandwidth, packet delay. To reduce the handover time to a minimum an optimised new route in network 20 is preferably determined and resources allocated and synchronised when necessary before the handover is completed, whereby at least part of the old route is re-used wherever possible. In accordance with the present invention at least a part of the series of switching nodes 31, 26, 27, 28 are preferably reused in the new network connection from base station 23 to gateway switch 31. The more of the current route supporting the current communication to base station 22 which can be re-used, the less time it is necessary to set up the communications through the new switching nodes present in the new route to base station 23, however, such a new route may be longer or cause more traffic problems than another route. Hence, an optimum new route may include a choice between different potentially conflicting requirements and limitations. There are various known methods for selecting a new route in network 20 to support a handover from one cell to another. One technique involves sending a handover request from mobile terminal 33 to the original base station 22 providing an indication of the base station 23 which is to be the target base station of the handover. The mobile terminal 33 may assist in determining which of the base stations is the most suitable for handover by providing to network 20 indications of the signal strength or signal quality from signals received by mobile terminal 33 from target base stations such as 23. Alternatively, the mobile terminal 33 may contain sufficient intelligence to decide on the target base station based on its own measurements. Any handover decision algorithm which involves the mobile terminal 33 sending a handover request to the original base station 22 may suffer from the problem that the mobile terminal 33 loses communication with the old base station. For instance, if the mobile terminal 33 is close to the point at which a handover is required, the signal strength and quality of transmissions to and from base station 22 is likely to be poor. In large metropolitan areas shadowing effects may result in a very sudden temporary loss of communication with original base station 22 with the risk of a total loss of communication. On the other hand, mobile terminal 33 is moving towards base station 23 so it is to be expected that the signal strength and quality from base station 23 will continuously improve. In accordance with one embodiment of the present invention it is preferred if the mobile terminal 33 sends the handover request to the target base station 23 rather than to the original base station 22. Further, in order to speed up handover in accordance with the present invention, mobile terminal 33 sends information to base station 23 in the handover request which explicitly identifies at least some of the switching nodes 26 to 28 and 31 of network 20 which are involved in supporting the current communication. This information can be used by network 20 to determine an optimum new part of the path required to the base station 23 from one of the switching nodes 26, 27 or 28 while re-using the rest of the network. In addition the mobile terminal may send, in accordance with another embodiment of the present invention a pre-verified and authorised signature with the handover request. As the nodes of network 20 which support the current communication have been informed of the signatures useable by mobile terminal 33, the time for verification and authentication of the mobile terminal is reduced.

The switch which is the last switch in the old communication path which can be re-used is called the "cross-over switch". In accordance with the present invention, the information in the handover request specifying the switching nodes involved in the current communication should be an explicit reference to these nodes which are potential cross-over switches rather than only a reference to virtual connections or links used in the existing communication. For example, in accordance with the present invention a list of network addresses or address aliases of the switching nodes 26, 27, 28 and 31 may be transmitted with the handover request from mobile 33 to the target base station 23. The purpose of sending the addresses to the target base station is to allow the network to immediately identify the switching nodes involved in the current communication and to ascertain whether any of the nodes 26, 27, 28 and 31 lies on a potential new route through network 20 to base station 23. In particular, network 20 can determine from the transmitted list of addresses which of the nodes 26–28, 31 in the existing communication path could or should be the start of the new part of the path to base station 23. The new part of the path to base station 23 must be set up from the crossover switch and therefore it is preferred in accordance with this embodiment of the present invention if the nodes whose addresses are transmitted to the target base station 23 by the mobile terminal 33 are switches which are capable of setting up such a new path through network 20. The mobile terminal 33 does not need, in accordance with the present invention, to transmit the addresses of all the switching nodes involved in the current communication. For instance, only the addresses of switches which may serve as crossover switches may be transmitted as not every switch may be able to reroute a communication and thus be suitable as a potential cross-over switch.

As an example of the first embodiment of the present invention, a seamless hard handover in an ATM (asynchronous transfer mode) network 20 will be described, however, the present invention is not limited thereto. It is anticipated that the exact form of communication transfer, whether Internet protocol (IP), Mobile IP, ATM or any other protocol, is not a limitation on the present invention although it may well affect the detailed implementation thereof.

In an ATM network a communication is broken up into discrete "packets" or "cells" whereby in the following the word packets will be used in order to avoid confusion between these communication cells and geographical cells. Each packet is sent one at a time through the network 20. In order to make optimal use of each connection, packets from many different callers may simultaneously share the same communication link in the network thus requiring that each packet is distinguished from other packets in some way. ATM packets are divided into two sets or fields of information. One set is the information which the user intends to transmit and the other set is called the "header". Additional fields may be added where more complex switching techniques are used. The header contains routing information, including a virtual channel identifier (VCI). The VCI is an indication which is assigned to the packet which allows an ATM switch to know where to send the packet next based on the switch port where the packet has been received. A conventional ATM switch has several input and output ports. The ATM switch keeps a record of the input port, the VCI for the input port, the output port and the VCI for the output port for example in a "look-up table". For every possible input port and incoming VCI combination, there is a corresponding output port and outgoing VCI combination programmed into the look-up table. When an ATM switch receives a packet at the given port, the ATM switch will find the row in the look-up table which has the incoming VCI and input port corresponding to the received packet. The ATM switch will then switch or route the packet to the output port which appears in the same row and replaces the incoming VCI in the packet header with the outgoing VCI.

Figures 2, 4A, 4B:
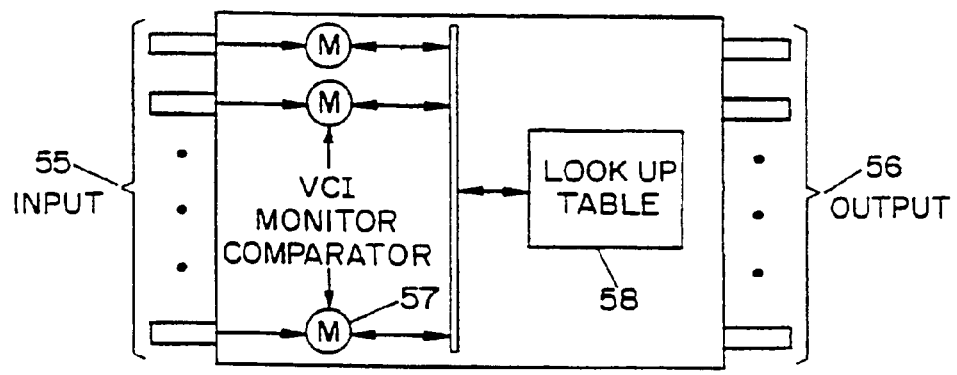
FIG. 2 is a schematic representation of a switch rerouter in accordance with the present invention.
Figure 3:
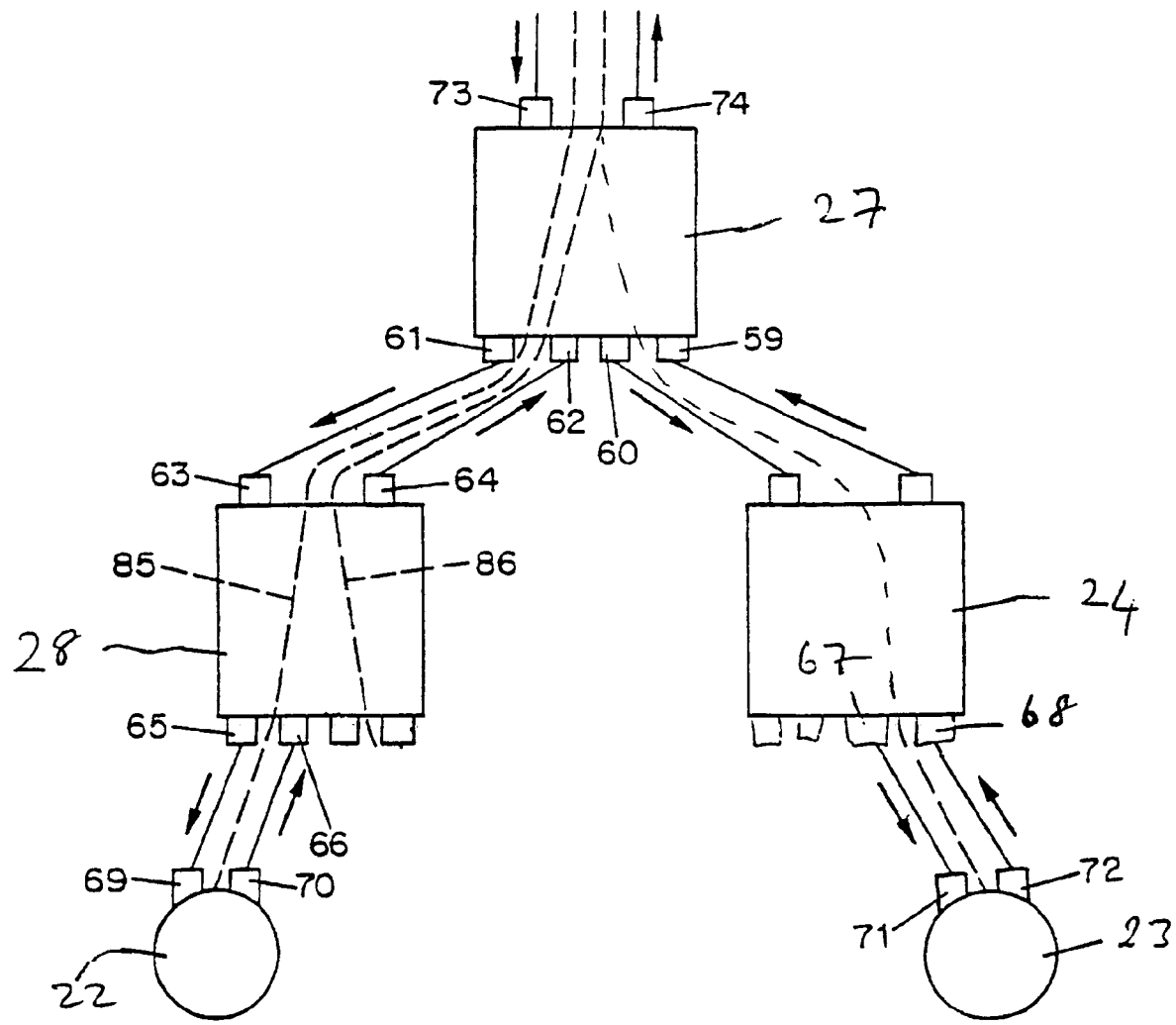
FIG. 3 is a schematic representation of part of the network of FIG. 1.

It is preferred in accordance with the present invention if the header of the ATM packets used for communication to and from a mobile terminal 21 to 23 includes an identifier for that mobile terminal, i.e. a signature or signatures. Methods of generating secure signatures are known to the skilled person. In accordance with the present invention, a number of secure signatures may be provided to a mobile terminal from a suitable authentication unit within the mobile telecommunications system and this list of signatures may be communicated to all nodes of the network 20 which supports a communication to or from the mobile terminal 21–23. ATM switches in network 20 which are suitable as potential crossover switches will be called "switch rerouters" in accordance with the present invention. These switch rerouters have the capability to reroute a packet, i.e. to provide the packet with a different VCI and to send it to a different port than previous packets of the same communication. A switch rerouter 27 in accordance with one embodiment of the present invention is shown schematically in FIG. 2. The switch rerouter 27 performs the rerouting of the virtual channel connection during handover. It is an ATM switch having input ports 55 and output ports 56. At each input port 55 of the switch rerouter 27, there is a monitor/comparitor 57 which has read/write access to the switch's look-up table 58. In the table 58 information may be stored which not only associates a virtual channel connection with an incoming and outgoing VCI as well as the incoming and outgoing switch ports of the connection but also the signature or signatures of the mobile terminal 33 using the connections may be stored optionally. FIG. 4 shows one example of an implementation of this embodiment which includes a look-up table in an ATM switch rerouter in accordance with the present invention but the present invention is not limited to look-up tables as only method of implementation of this embodiment. With reference to FIGS. 2 to 4, when the mobile user 33 is communicating via the base station 22 there is a virtual channel connection established through network 20 from base station 22 to gateway switch 31. When the communication is set up, the signature or list of signatures of mobile terminal 33 is communicated to all nodes of the network supporting the call, e.g. base station 22, switch 28, etc. by network 20 and the signature or list of signatures is written into the look-up table of each such node on the row including the virtual channel indication VCI of the communication (FIG. 4a). Communications which leave the base station 22 are assigned a virtual channel identifier VC1 by base station 22. The packets are transmitted via output ports 70 to input ports 66 of switch 28 (which is a normal ATM switch). Switch 28 reads the VCI from the header of each packet, consults its look-up table (FIG. 4a) using VC1 and input port 66 as search parameters and assigns a virtual channel identifier VC3 to each packet to let ATM switch rerouter 27 know where the communication is coming from and what the packet's final destination is. The packet is transmitted via output port 64 of switch 28 to input port 62 of the ATM switch rerouter 27. The monitor/comparitor 57 of ATM switch rerouter 27 reads VC3, consults its look-up table (FIG. 4B) and checks that the "Enabled" flag has been set to "1", meaning that this is an active communication. The packet is then assigned the virtual channel identifier VC4 to instruct the next switch 26 where the packet is destined to go.

Packet communications travelling towards base station 22 from outside network 22 will arrive at ATM switch rerouter 27 from switch 26 at input port 73 with a virtual channel identifier VC1. The monitor/comparitor 57 at input port 73, consults its look-up table and assigns a virtual channel identifier of VC2 to indicate to switch 28 that the packet is destined for base station 22, and checks that the "Enabled" flag has been set to "1" (FIG. 4B). The packet leaves via output 61 and enters input port 63 of switch 28. Switch 28 reads VC2 and after consulting its look-up table (FIG. 4A) gives the packet the virtual channel identifier VC0 which is switched to output port 65 and is transmitted to base station 22 via input port 69.

In accordance with this embodiment of the present invention, a specific message sent between gate way switch 31 and base station 22 contains a code in its header which is read by monitor/comparitor 57 in each switch rerouter 27 and causes each switch rerouter 27 to include its own network address or its address alias into the message and to forward it along the established communications path to base station 22. Thus, the base station 22 receives, via this message, a list of the addresses or aliases of all the switch rerouters along the communication path of the current communication. Base station 22 then transmits the list of addresses of the current switch rerouters on the current path to mobile terminal 33 via the air interface. The mobile terminal 33 stores this information. Note that switches along the route which are normal ATM switches and not switch rerouters do not have a monitor comparitor 57 and therefore do not react to the address interrogation signal and their addresses are not included in the list of addresses sent to the mobile terminal 33. Similarly, an address interrogation signal is transmitted from base station 22 towards gateway 31 as part of the call set up and the list of addresses of switch rerouters along this path is stored in gateway 31.

In this embodiment of the present invention, call handover is initiated by the mobile user 33. The handover procedure may be initiated by anyone of several well known means. For example, the mobile terminal 33 may monitor power from each of the base stations in its vicinity and initiates a handover whenever the signal strength received from the terminals original base station approaches some lower threshold of QoS and there is at least one other base station from which an acceptably high power level is detected. The mobile terminal 33 then transmits a handover request to the selected target base station 23. The handover request may include the or a current signature of mobile terminal 33, the list of addresses of the switch rerouters 26, 27 currently supporting the communication and optionally a definition of the minimum and/or current QoS of the existing communication, e.g. bandwidth, urgency, maximum packet delay, priority. Base station 23 is provided with sufficient topological information relating to the network and processing power to decide if one or more of the switch rerouters 26, 27 included in the list lie on the usual communication path for this base station. Optionally, base station 23 may also have sufficient information over the topology of network 20 so that it can determine the length and number of switching nodes between base station 23 and one or more of the switch rerouters 26, 27 included in the transmitted list of addresses. Further, base station 23 is able to verify that the signature of the mobile terminal allows access to the network. Preferably, base station 23 does not have to carry out an interrogation request to centralised network elements such as an authentication centre in order to determine this. Instead, it is preferred for time saving reasons if either the current list of all signatures of mobile terminals camped on or communicating with the network is transmitted to each base station so that the base station 23 can rapidly determine if the signature is enabling, or, which is the preferred method, the signature of the mobile terminal 33 is verified when the base station requests the relevant switch rerouter to set up a new path. The base station 23 selects one of the switch rerouters 26, 27 as the crossover switch for the handover dependent upon a suitable algorithm, for instance, the route with the minimum number of hops between base station 23 and the crossover switch or by any other suitable method. Having selected the appropriate crossover switch, let us say switch rerouter 27, the base station 23 sends a signal to switch rerouter 27 to set up a path between switch 27 and base station 23, to reserve the necessary resources in this new path and to synchronise ready for a transmission from mobile terminal 33 to base station 23. This signal from the base station 23 includes the current signature of mobile terminal 33, so that when the signal arrives at crossover switch 27, the switch rerouter 27 can determine from its look-up table whether the signature already exists in the look-up table because it has been previously communicated to this switch-rerouter 27 by the network. If it does the switch rerouter 27 may set up a new path. If not the switch 27 sends a message to the base station 23 "mobile not authenticated" and the base station 23 either sends a "handover request denied" signal to the mobile terminal 33 or the base station 23 requests authentication from network 20 in the conventional way. Assuming the switch rerouter 27 finds the signature innits look-up table, it determines from the look-up table which virtual connections and input and output ports are involved in the communication to be re-routed. Then switch rerouter 27 sets up a communication path to base station 23 parallel to the communication to base station 22. For instance, switch rerouter 27 sets up a communication to switch 24 so that packets received at input port 73 are transmitted via output port 60 but given a VCI of VC7 which indicates to switch 24 that the communication is for base station 23. As this new communication is not active at the present time, the "Enabled" column is set to "0". Similarly, incoming packets from base station 23 via switch 24 with a VCI of VC5 arriving at port 59 are assigned a VCI of VC4 and transmitted via port 74 to indicate to switch 26 that these packets are for gateway 31. Again the enabled column is set to "0" in the look-up table as this is not an active communication yet. When this procedure is complete switch 26 informs the base station 23 of the completion and the base station 23 acknowledges the handover request to mobile terminal 33.

When mobile terminal 33 receives the handover request acknowledgement it sends a handover command to base station 23. Base station 23 transmits the handover command to crossover switch 27 using the VCI now associated with this connection. When crossover switch 27 receives the handover command it acknowledges the command to the mobile terminal 33 via base station 23 and switches the existing communication from the current output ports to the new output ports. It does this by changing the enabled connections to not enabled and the not enabled connections to enabled. That is the entries in the look up table (FIG. 4B) are changed from "1" to "0" and vice versa. At the same time mobile terminal 33 begins to communicate via base station 23 and sends a control message that the handover is completed. The handover complete message is sent to switch 27 which then instructs switch 28 in the old communication path to tear down the communication. Network 20 may then update the signature or list of signatures for mobile terminal 33 in each of the nodes of the new communication path including the mobile terminal 33 so that the old signature used for setting up this new communication is deleted and cannot be used by an interloper who has received the signature sent in clear by mobile 33 with the handover request.

If the target base station 23 does not recognise any of addresses of the switch rerouters on the current path transmitted by the mobile terminal, the handover request may be transferred to the next higher switch and so on until a switch is reached which has one of the named switch rerouters in the transmitted list within its normal communication pattern. Alternatively, if the target base station 23 does not recognise any of addresses of the switch rerouters on the current path transmitted by the mobile, a completely new path establishment can be initiated.

In accordance with a modification of this embodiment the mobile terminal 33 may optionally communicate with at least 2 or more base stations at the same time. This may be carried out, for example, in an FDMA/TDMA system such as the European GSM mobile telecommunications network by a separate receiver at each base station which is specifically allocated to search for and synchronise with handover requests from mobile terminals not within the radio cell of its own base station. Alternatively, techniques such as disclosed in U.S. Pat. No. 5,483,668, or U.S. Pat. No. 5,577,047 may be used to provide the mobile terminal with the function of communicating with two base stations at the same time. Alternatively, CDMA or TDMA/CDMA systems or similar systems may be used in which the mobile terminals can support communications with more than one base station at the same time.

Figure 5:
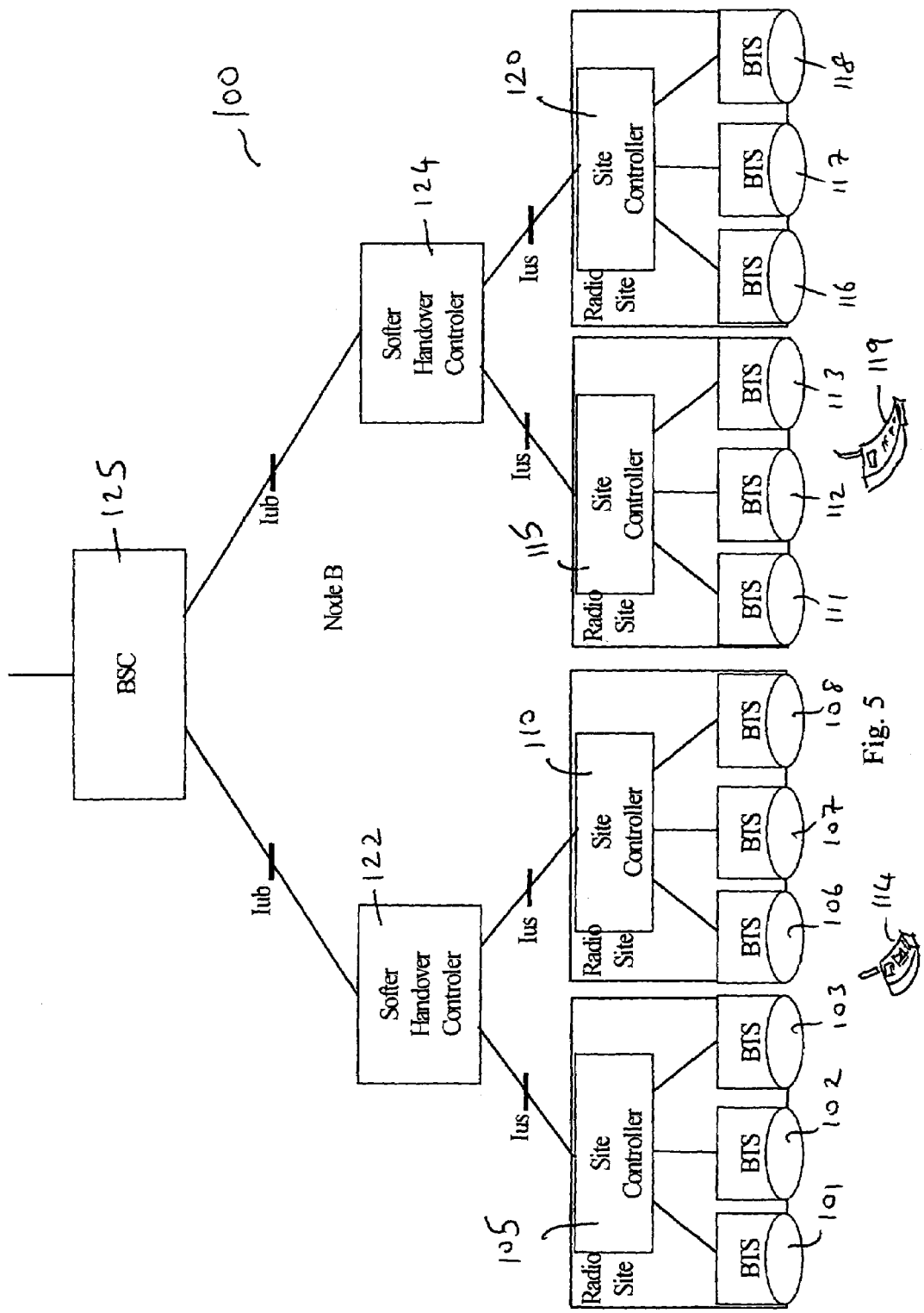
FIG. 5 is a schematic representation of a network in accordance with a second embodiment of the present invention.

A second embodiment of the present invention will be described with reference to FIGS. 5 to 7. The second embodiment includes a mobile telecommunications network 100 in which mobile terminals 114, 119 may communicate with more than one base station 101–103, 106–108, 111–113, 116–118 simultaneously via radio links on a radio air interface. As an example, the communication system 100 may use a spread spectrum access method for the mobile terminals 114, 119, e.g. a CDMA, an FDMA/CDMA, a TDMA/CDMA, or an FDMA/TDMA/CDMA system or similar, in particular any system using direct sequence spread spectrum techniques. Typically, each base station 101–103; 106–108; 111–113; 116–118 will transmit a beacon or pilot signal which can be processed by any mobile terminal. In an exemplary CDMA system, each base station transmits a pilot signal having a common PN spreading code that is offset in code phase from the pilot signal of other base stations. During system operation, the mobile unit is provided with a list of code phase offsets corresponding to neighboring base stations surrounding the base station through which a communication is established. The mobile unit is equipped with a searching element that allows the mobile unit to track the signal strength of the pilot signal from a group of base stations including the neighboring base stations. The pilot signal will be typically used by a mobile terminal for initial synchronisation.

Each group of base stations 101–103; 106–108; 111–113; 116–118 may be controlled by a site controller 105; 110; 115; 120. Each triplet of base stations 101–103; 106–108; 111–113; 116–118 may serve the three sectors of one site. Site controllers 105; 110; 115; 120 communicate with a base station controller (BSC) 125 which in turn may be connected to other switches within the network and to other networks such as a pubic telephone network (PSTN). In particular, network 100 may be configured so that each BSC 125 can communicate with any of its neighbour BSC's directly. The protocols used for communicating between the BSC, the site controllers and other switches in the networks are not considered to be a limitation on the present invention and may be, for example, an IP, and IP/TCP, an ATM protocol or any other suitable protocol. Softer handover controllers (SHC) 122, 124, each of which is associated with one or more site controllers 105, 110, 115, 120 may be provided for combining signals from several base stations to improve overall reception.

Figure 6:
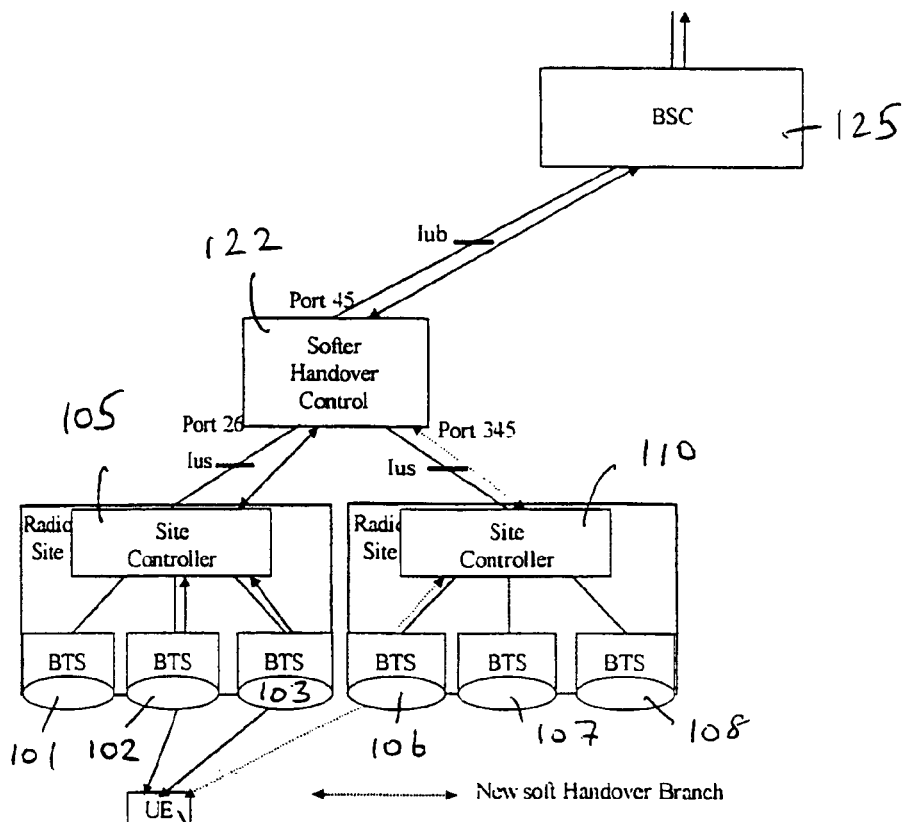
FIG. 6 is a schematic representation of part of the network of FIG. 5 during a soft handover.
Figure 7:
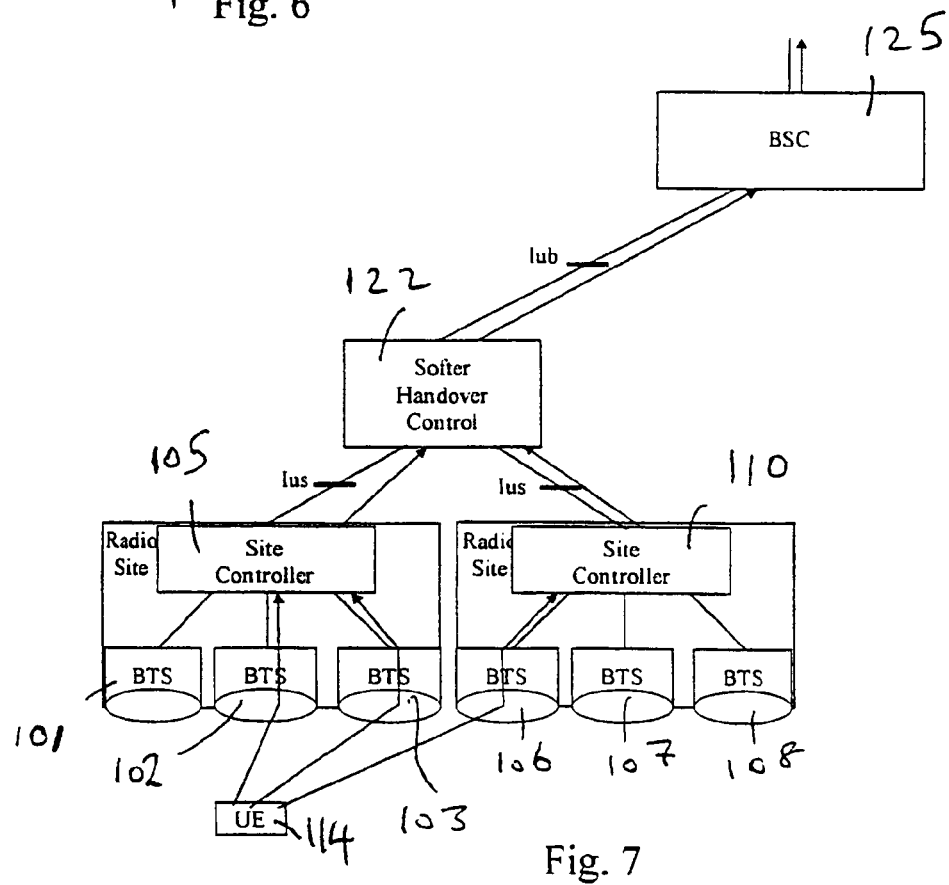
FIG. 7 is a representation of the network after the soft handover of FIG. 6 is complete.

As shown in FIG. 6 the mobile terminal 114 is communicating simultaneously with base stations 102, 103 via two radio links in a soft handover situation. Thus, base stations 102, 103 are in the Active set of mobile terminal 114. When a pilot or beacon signal of a base station such as 106 in the Neighbour Set exceeds a predetermined threshold level, for instance, the base station 106 may be added to the Candidate Set and removed from the Neighbour Set of the mobile terminal 114. The mobile terminal 114 may either communicate a message to the original base stations 102, 103 identifying the new base station 106 and a decision made as to whether to establish communication between the new base station 106 and the mobile terminal 114 or, which is the preferred embodiment of the present invention, the mobile terminal 114 decides whether communications should also begin with base station 106. Should the communication system 100 or the mobile terminal 114 decide a soft handover is necessary, the mobile terminal 114 sends a handover request to the new base station 106 with identifying information about the mobile terminal 114 as well as explicit information defining each of the nodes of the network which support the current communication. The handover request may include the or a currently authenticated signature, a request to establish communications with the target base station 106, a list of the addresses of the nodes of the network which are involved in the present call and, optionally, a specification of the appropriate QoS of the communication. This list will include at least the addresses of site controller 105, and the BSC 125 and optionally the SCH 105 and base stations 102, 103 or more nodes higher in the network. On receipt of the message, base station 106 examines the list of addresses of the nodes supporting the current call as well as the signature of mobile terminal 114. As explained with respect to the first embodiment it is preferred if a target base station such as 106 is able to verify the signature of mobile terminal 114 without having to interrogate the network. Accordingly, the pre-authenticated signature or list of signatures is previously sent by the network to all the nodes supporting the current communication path and stored in each one. The target base station 106 determines that the BSC 125 is common to both the list of addresses and its own usual communication path through the network, i.e. the BSC 125 is part of its communication tree. Base station 106 then instructs BSC 125 to set up new path including the new radio link between base station 106 and mobile terminal 114. The command includes the signature of the mobile terminal 114. The BSC 125 compares the received signature with the signature or the list of signatures it has previously received from the network. Assuming the BSC 125 finds the signature, i.e. it has already been authenticated, BSC 125 instructs the SHC 122 to make ports available to carry communications to and from base station 106 and to soft combine the new communication to and from base station 106 with the communications from base stations 102, 103. If this is not possible as not all the communications go through SHC 122 the soft combining may be done in BSC 125. Once the new path is set up, target base station 106 acknowledges the handover request to mobile terminal 114. The acknowledgement message may identify a new Active Set to the mobile terminal 114 that includes the original base stations 102, 103 and the new base station 106. The mobile terminal 114 searches for the information signal (pilot) transmitted from the new base station 106 and communication is established with the new base station 106 without termination of communication through the original base stations 102, 103 (FIG. 7).

If the target base station 106 does not recognise any address in the list of addresses from the mobile 114 which is known to be in the communication tree of the target base station 106, an alternative procedure is necessary. The target base station may pass the handover request and the list of addresses to the BSC 125 which then determines if one of the addresses relates to a network node which is associated with this BSC 125, e.g. a neighbouring BSC. If so, the BSC 125 sets up the new path to the neighbouring BSC and to the target base station 106 using a BSC-BSC direct communication link mentioned above. If BSC 125 does not recognise any of the addresses, the handover request may be sent up the hierarchical layers of the network until a node is found which can connect to one of the nodes whose address is in the list. Alternatively, if a suitable switch is not found within a ore-determined time, a new route may be established to target base station 106 using conventional techniques.

When the mobile terminal 114 is communicating through two or more base stations 102, 103, 106, it continues to monitor the signal strength of pilot signals from the base stations of the Active Set, the Candidate Set, and the Neighbour Set. Should the signal strength corresponding to a base station 102, 103, 106 of the Active Set drop below a predetermined threshold for a period of time, or the signal quality deteriorate so that it no longer meets the QoS requirements, the communication system 100 or more preferably the mobile terminal 114 may decide to terminate communications through this base station 102, 106.

In accordance with a modification of this embodiment communication from a mobile terminal may be restricted to a limited number of base stations simultaneously, e.g. two. This reduces the simultaneous use of radio and network resources for the same communication. However, although only two base stations are used simultaneously, the above procedure guarantees that any new communication path set up to a potential target base station meets the QoS requirements and also includes a re-use of the old communication path.

As described above the procedure in accordance with the present invention is described as being used to decide a member of the active list. In an alternative of the second embodiment, the same procedure may be used to determine a new member of the Candidate list. In this case the same procedure as described above is used once a pilot or beacon signal of a base station in the Neighbour Set exceeds a predetermined threshold level. This target base station is not immediately added to the Candidate list but rather the procedure for setting up the new path in the network is carried out as described above.

The mobile terminal sends the list of addresses of the nodes of the network supporting the existing call with a request for communication to the target base station and the new path is set up to the target base station making reuse of the existing route. Thus, after carrying out the procedure in accordance with the present invention, parallel routes are set up through the network each capable of meeting the QoS requirement of the current transmission, however, only the old route or routes supports or support the current communication. The final decision to bring a member base station of the Candidate list to the Active list and to start an active duplex communication therewith can be made at a later time. In accordance with this embodiment the network resources are set up for each member of the candidate list but the radio resources are only committed at a later time.

This ties up the network resources possibly unnecessarily but network resources are normally not the limiting resources compared with the radio resources.

Figure 8:
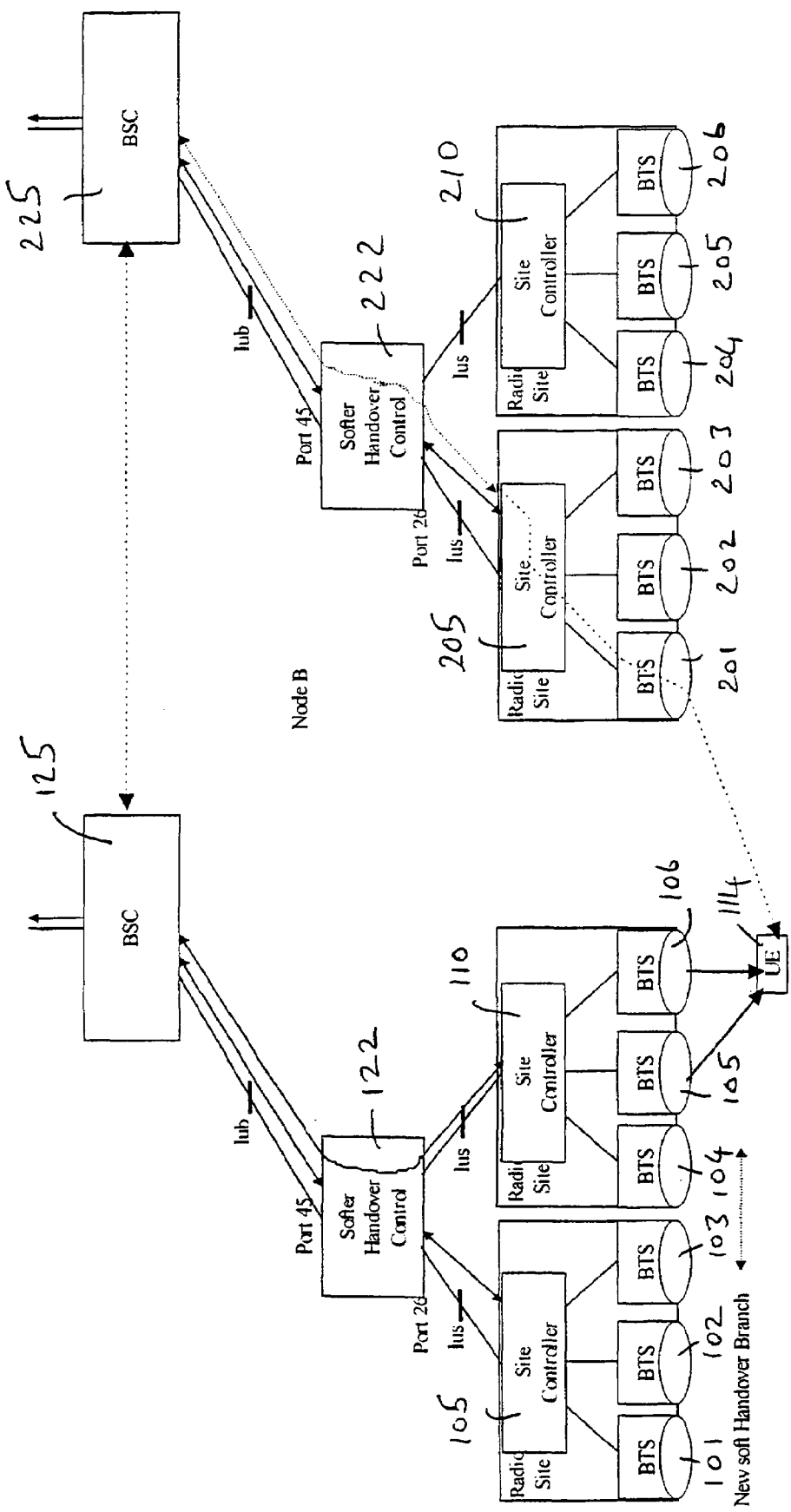
FIG. 8 is a schematic representation of a network supporting a soft handover in accordance with a third embodiment of the present invention.

In accordance with a third embodiment of the present invention a combination of route extension and partial path replacement during handover with optional partial re-routing after handover is used. In accordance with this embodiment one node of the network is designated as an anchor node during the handover and remains as one node of the communication path both before and after the handover. Typically, one type of node, for example, a base station controller or a mobile switching centre will be assigned the duties of the anchor for handovers. Whichever network element is chosen for this role, it is preferably if each such element can communicate with each other element within the network. For instance, as shown in FIG. 8, the anchor node may be an anchor BSC 125. As long as any handover can be routed through this BSC 125 alone, the procedure as described for the second embodiment is carried out. However, when a handover is necessary to a target base station such as 201 which no longer has the anchor BSC 125 in its communication tree, a different procedure is carried out. Let us assume that the mobile terminal 114 is currently in communication with base stations 107, 108 and has decided to crate a new radio link to base station 201 (soft handover). The handover request from the mobile terminal 114 to the target base station 201 preferably includes the or a signature of the mobile terminal 114, the list of addresses of the current nodes (107, 108, 1110, 122, 125) of the current communications tree and the optional definition of QoS requirements for the new link. The target base station 201 consults the list of addresses, recognises none of them and transfers the list of addresses and the other items of the handover request to the BSC 225. The BSC 225 then examines the list and identifies the address in the list which relates to a neighbouring BSC, namely the anchor BSC 125 and sends a handover request to BSC 125 including the signature of the mobile terminal 114. The BSC 125 being the anchor BSC recognises the signature as an authentic one and sets up a communication between itself and the anchor BSC 225 along a communication path which directly connects the two BSC's 125, 225 while maintaining the existing communications to base stations 107, 108. The new link is then set up with the target base station 201 using the existing communications path up to the anchor BSC 125 and then a new path via the BSC 225, SHC 222, site controller 205 to the target base station 201. Signal combining of all three links may be carried out in the anchor BSC 125.

As long as some communication passes through one of the base stations 101–108 which are the base stations dependent on the communications tree from anchor BSC 125, this BSC 125 remains as the anchor. However, after several handovers a time will come when no communications pass through one of the base stations 101–108 anymore. At such a time a partial path re-routing and optimisation operation can be carried out to simplify the communication path, e.g. by eliminating the anchor BSC 125 in the communication path by transferring the anchor property of the BSC 125 to the new BSC 225. In accordance with the present invention this is preferably done outside a handover operation. This is also preferably true for any path re-routing required to upgrade the QoS of a call.

A fourth embodiment of the present invention will be described as a modification of the second and third embodiments. The fourth embodiment relates to mobile telecommunication systems which use fast power control, for instance CDMA systems or other systems using spread spectrum tecniques like direct sequence spreading. Fast power control is described in U.S. Pat. No. 5,056,109, for instance. In fast power control, the transmit power of a mobile terminal is controlled from the base station. Each base station receiver of a cell measures the strength of the signal received from each mobile terminal. The measured signal strength is compared to a desired signal strength level for the mobile terminals in the cell. A power control adjustment command is sent to each mobile terminal with which the base station transceiver is in communication. In response to the power adjustment command, each mobile unit increases or decreases its transmit power by a predetermined amount, e.g. 1 dB or makes no change. The power adjustment command is transmitted by the base station transmitter at a relatively high rate, typically of the order of one per millisecond.

In accordance with the fourth embodiment the fast power control is started by the target base station before the new path has been set up through the network to the target base station. Thus, even before the radio link for traffic to and from the target base station and the mobile terminal has been completely set up, the target base station starts to fast power control the mobile terminal. Hence, the fourth embodiment is a modification of either the second or third embodiment (other details remaining the same) in which fast power control is started by the target base station substantially immediately on receipt of the handover request and before the receipt of the handover command from the mobile terminal 114. Other details of the second and third embodiments remain as previously described. The fast power control commands may be sent in a suitable channel from the target base station to the mobile terminal. The fast power control of the mobile terminal before the communication from the target base station may deny the mobile terminal of the spatial diversity provided by the radio link from the target base station whcih may result in power being reduced and the loss or worsening of the reception of the existing radio links. It is preferred, however, if one mobile terminal receives poor reception for a short period of until the handover is complete rather than endangering many communiactions in the target cell.

While the invention has been shown and described with reference to preferred embodiments, it will be understood by those skilled in the art that various changes or modifications in form and detail may be made without departing from the scope and spirit of this invention as defined in the attached claims. For example, the present invention is not limited to handover procedures. For instance, if the communication with a current base station is lost the mobile terminal may attempt call re-establishment with the previous base station or an alternative base station, whichever has the pilot or beacon with the best signal quality using a request similar to the forward handover request described with respect to the above embodiments. The mobile terminal sends the list of addresses of the nodes of the network supporting the now-lost call with the call re-establishment request to the chosen target base station. As the network receives exact details of the nodes in the network supporting the now-lost call via the new base station, the call can be re-established in the minimum of time. As the target base station may address a suitable switch in the existing communication path quickly and directly thanks to the explicit address information in the request from the mobile terminal there is a significantly improved possibility that the call is still pending at the chosen switch.

The invention claimed is:

1. A method of operating a telecommunications system in which mobile terminals may communicate with base stations over an air interface and a communications network is provided for linking each base station to other points in the network via one or more nodes, a communication to another user terminal being supported by one or more first radio links between one or more current base stations and a mobile terminal through a plurality of current nodes of the system, the method comprising the steps of:

providing to the mobile terminal information defining explicitly at least some of the current nodes of the communications network supporting the communication; and, in preparation for setting up a further radio link between the mobile terminal and a target base station while the current one or more first radio links are still supporting the communication or one or more of the first radio links has just been lost: the mobile terminal transmitting the information defining explicitly at least some of the current nodes of the communications network supporting the communication to the target base station.

2. A method according to claim 1, wherein the information is a list of addresses of the relevant network nodes.

3. A method according to claim 1, further comprising the step of at least partially re-using the old communication path supporting the one or more first radio links for the new communication path including the further radio link, whereby the reused part of the old communication path terminates on one of the nodes defined in the information.

4. A method according to claim 1, wherein the method is part of a handover procedure or call re-establishment or assignment of a target base station to candidate set from neighbour set or assignment of a target base station from candidate set to active set.

5. A method according to claim 4, wherein the method is part of a handover procedure and the further radio link is set up before the one or more first radio links are terminated.

6. A method according to claim 1, wherein the explicit information defining nodes supporting the existing communication includes explicit information defining at least two levels of a hierarchical telecommunications network.

7. A method of operating a telecommunications system in which mobile terminals may communicate with base stations over an air interface and a communications network is provided for linking each base station to other points in the network via one or more nodes, a communication to another user terminal being supported by one or more first radio links between one or more current base stations and a mobile terminal through a plurality of current nodes of the system, the method comprising the steps of:

providing to the mobile terminal information defining explicitly at least some of the current nodes of the communications network supporting the communication; and, in preparation for setting up a further radio link between the mobile terminal and a target base station while the current one or more first radio links are still supporting the communication or one or more of the first radio links has just been lost: the mobile terminal transmitting the information defining explicitly at least some of the current nodes of the communications network supporting the communication to the target base station, and providing the mobile terminal with pre-authenticated reference data for that mobile terminal; copying the pre-authenticated reference data to at least some of the current nodes of the communications network supporting the communication; and, in preparation for setting up the further radio link between the mobile terminal and the target base station: the mobile terminal transmitting at least a part of the pre-authenticated reference data to the target base station.

8. A method of operating a telecommunications system in which mobile terminals may communicate with base stations over an air interface and a communications network is provided for linking each base station to other points in the network via one or more nodes, a communication to another user terminal being supported by one or more first radio links between one or more current base stations and a mobile terminal through a plurality of current nodes of the system, the method comprising the steps of:

providing to the mobile terminal information defining explicitly at least some of the current nodes of the communications network supporting the communication; and, in preparation for setting up a further radio link between the mobile terminal and a target base station while the current one or more first radio links are still supporting the communication or one or more of the first radio links has just been lost: the mobile terminal transmitting the information defining explicitly at least some of the current nodes of the communications network supporting the communication to the target base station, and the target base station beginning fast power control with the mobile terminal in preparation for setting up the further radio link between the mobile terminal and the target base station before the path through the network supporting the further radio link is complete.

9. A telecommunication system in which mobile terminals communicate with base stations over radio links, comprising:
a communications network for linking each base station to other points in the network via one or more nodes, a communication between a mobile terminal and another user terminal being connected via one or more first radio links to one or more current base stations and through a plurality of current nodes of the network, wherein, in preparation for setting up a further radio link between the mobile terminal and a target base station while the current one or more first radio links are still supporting the communication or one or more of the first radio links has just been lost, the mobile terminal is adapted to transmit to the target base station information defining explicitly at least some of the current nodes of the communications network supporting the communication.

10. A system according to claim 9, wherein the information is a list of addresses of the relevant network nodes.

11. A system according to claim 9, wherein the communication path including the further radio link partially reuses the communication path including the one or more first radio links, the reused part terminating on one of the nodes defined in the information.

12. A system according to claim 9, wherein the explicit information defining nodes supporting the existing communication includes explicit information defining at least two levels of a hierarchical telecommunications network.

13. A telecommunication system in which mobile terminals communicate with base stations over radio links, comprising:
a communications network for linking each base station to other points in the network via one or more nodes, a communication between a mobile terminal and another user terminal being connected via one or more first radio links to one or more current base stations and through a plurality of current nodes of the network, wherein, in preparation for setting up a further radio link between the mobile terminal and a target base station while the current one or more first radio links are still supporting the communication or one or more of the first radio links has just been lost, the mobile terminal is adapted to transmit to the target base station information defining explicitly at least some of the current nodes of the communications network supporting the communication and wherein the system is adapted to provide the mobile terminal with pre-authenticated reference data for that mobile terminal and for copying the pre-authenticated reference data to at least some of the current nodes of the communications network supporting the communication, and, in preparation for setting up the further radio link between the mobile terminal and the target base station, the mobile terminal is adapted to transmit to the target base station at least a part of the pre-authenticated reference data.

14. A telecommunication system in which mobile terminals communicate with base stations over radio links, comprising:
a communications network for linking each base station to other points in the network via one or more nodes, a communication between a mobile terminal and another user terminal being connected via one or more first radio links to one or more current base stations and through a plurality of current nodes of the network, wherein, in preparation for setting up a further radio link between the mobile terminal and a target base station while the current one or more first radio links are still supporting the communication or one or more of the first radio links has just been lost, the mobile terminal is adapted to transmit to the target base station information defining explicitly at least some of the current nodes of the communications network supporting the communication and wherein the target base station is adapted to begin fast power control with the mobile terminal station before the path through the network supporting the further radio link is complete.

15. A method of operating a telecommunications system in which mobile terminals may communicate with base stations over an air interface and a communications network is provided for linking each base station to other points in the network via one or more nodes, a communication to another user terminal being supported by one or more first radio links between one or more current base stations and a mobile terminal through a plurality of current nodes of the system, the method comprising the steps of: providing the mobile terminal with pre-authenticated reference data for that mobile terminal; copying the pre-authenticated reference data to at least some of the current nodes of the communications network supporting the communication; and, in preparation for setting up a further radio link between the mobile terminal and a target base station while the current one or more first radio links are still supporting the communication or one or more of the first radio links have just been lost: the mobile terminal transmitting at least apart of the pre-authenticated reference data to the target base station.

16. A telecommunication system in which mobile terminals communicate with base stations over radio links, comprising:
a communications network for linking each base station to other points in the network via one or more nodes, a communication between a mobile terminal and another user terminal being connected via one or more first radio links to one or more current base stations and through a plurality of current nodes of the network, wherein, the system is adapted to provide the mobile terminal with pre-authenticated reference data for that mobile terminal and for copying the pre-authenticated reference data to at least some of the current nodes of the communications network supporting the communication, and, in preparation for setting up a further radio link between the mobile terminal and a target base station while the current one or more first radio links are still supporting the communication or one or more of the first radio links have just been lost, the mobile terminal is adapted to transmit to the target base station at least a part of the pre-authenticated reference data.

17. A mobile terminal for use in a telecommunication system in which mobile terminals communicate with base stations over a radio interface via one or more radio links, the mobile terminal being adapted to transmit to a target base station information defining explicitly at least some of the current switching nodes of the communications network supporting an existing communication between the mobile terminal and one or more current base stations over one or more current radio links in preparation for setting up a new radio link between the mobile terminal and the target base station while the one or more current radio links are supported or have just been lost.

18. A mobile terminal according to claim 17, wherein the information is a list of addresses of the relevant network nodes.

19. A mobile terminal according to claim 17, wherein the explicit information defining nodes supporting the existing communication includes explicit information defining at least two levels of a hierarchical telecommunications network.

20. A network element for use in a telecommunication system in which mobile terminals communicate with base stations over radio links, the network element being adapted to receive information explicitly defining at least some of the current nodes of the communications network supporting an existing communication between a mobile terminal and one or more current base stations over one or more current radio links, and for setting up a communications path with a further network element using the explicit information in preparation for setting up a further radio link between the mobile terminal and a target base station while the current radio links are still supported or have just been lost.

* * * * *